United States Patent Office 3,592,803
Patented July 13, 1971

3,592,803
MALONAMIDES AS ANTIPLASTICIZERS FOR POLYVINYL CHLORIDES
Clarence R. Bresson, Bartlesville, Okla., assignor to Phillips Petroleum Company
No Drawing. Filed Apr. 9, 1969, Ser. No. 814,800
Int. Cl. C08f 29/18
U.S. Cl. 260—92.8       7 Claims

ABSTRACT OF THE DISCLOSURE 2-aminomalonamides having a hydrocarbyl substituent on each of the three nitrogen atoms, for example, as in N,N'-dicyclohexyl-2 - (cyclohexylamino)malonamide, are used as processing aids and antiplasticizers for polymers of the poly(vinyl chloride) type.

---

This invention relates to polymer additives.

In one of its more specific aspects, this invention relates to compounds suitable for use either as processing aids or antiplasticizers for polymers, particularly polymers of the poly(vinyl chloride) type and also others such as poly(vinylidene chloride) types, poly(vinyl acetate), bisphenol polycarbonates, and bisphenol polyesters.

A polymer processing aid is generally evaluated on the basis of its ability to reduce processing temperatures, the time required by the polymer to flux and the amount of energy required to mix the formulation.

Inasmuch as the compounds of this invention are added to polymers for both purposes, the terms "processing aid" and "antiplasticizer" will be used synonymously herein with the effect of the compound in both applications being individually illustrated hereinafter.

The material of this invention possess such properties. According to this invention there is provided an antiplasticizer for polymers which comprises a substituted 2-aminomalonamide of the formula

wherein R is selected from alkyl, cycloalkyl, including bicycloalkyl, and aryl radicals and combinations thereof, such as alkaryl, aralkyl and the like, the number of carbon atoms in each of the R groups being within the range of about 2 to 30. Preferably, each of the R groups has about 5 to 18 carbon atoms, with each R group having at least one saturated carbocyclic ring containing at least 5 carbon atoms.

Accordingly, it is an object of this invention to provide a novel processing aid and antiplasticizer for polymers.

It is another object of this invention to provide a new class of compounds suitable for use in processing polymers.

Other aspects, objects and advantages of this invention will become evident from this discussion.

A large number of substituted 2-aminomalonamides are suitable as processing aids. Some of these are compounds such as N,N'-diethyl-2-(ethylamino)malonamide
N,N'-bis(1-methylnonacosyl)-2-(1-methylnonacosylamino)malonamide,
N,N'-dicyclopentyl-2-(cycylopentylamino)malonamide,
N,N'-dicyclooctadecyl-2-(cyclooctadecylamino)malonamide,
N,N'-di-2-norbornyl-2-(2-norbornylamino)malonamide,
N,N'-diphenyl-2-(phenylamino)malonamide,
N,N'-dibenzyl-2-(benzylamino)malonamide and various substituted 2-aminomalonamides complying with the above formula.

Some of the substituted 2-aminomalonamides can be prepared by the reaction of an ester of malonic acid, such as diethyl malonate, with an amine having the formula $RNH_2$, where R is as defined above, followed by bromination of the resulting N,N'-dihydrocarbyl-malonamide to give an N,N'-dihydrocarbyl-2-bromo-malonamide which can be converted to the substituted 2-aminomalonamide by reaction with additional amine of the formula $RNH_2$, R being as defined above.

Some of these compounds can be prepared by condensing an olefin with hydrogen cyanide in anhydrous hydrogen fluoride, and hydrolyzing the reaction mixture containing the reaction product with water to form the 2-aminomalonamide.

The following is an example of the latter method of preparation of compounds of the type concerned herein. Other related methods will be evident therefrom to one skilled in the art.

N,N'-dicyclohexyl-2 - (cyclohexylamino)malonamide was prepared by the following procedure: Into a mixture of 8.0 moles of hydrogen fluoride and 2.4 moles of hydrogen cyanide under a nitrogen atmosphere of 800 p.s.i.g. were introduced 2.0 moles of cyclohexane over a period of 38 minutes at 20° C., after which the mixture was agitated for four hours while being held at 45° C. The mixture was cooled and 250 ml. methylene chloride were added to the reactor, the contents of the reactor being then hydrolyzed with ice. The hydrolyzed solution was agitated and separated into two layers. The lower layer was made basic with sodium hydroxide, and the upper layer was separated.

The lower layer residue of about 258 grams of a viscous red-brown tar was allowed to stand at a temperature of about −5° C. until crystallization took place. The crystals were triturated with a solution of 85 percent acetone and 15 percent water and chilled.

Thereafter, the mixture was filtered and washed with 85 percent acetone to otbain a product which, upon recrystallization, yielded a white crystalline product having a melting point of about 119° C. and a formula of $C_{21}H_{37}N_3O_2$.

The amount of substituted 2-aminomalonamide incorporated in the polymer as processing aid can vary over a wide range. Generally, however, the substituted 2-aminomalonamide will be incorporated in an amount of about 0.2 to 50, preferably from about 1 to about 20, weight percent of the polymer. Blending of the substituted 2-aminomalonamide with the polymer can be carried out in any of the conventional mixing methods, after which the mix is extruded or milled on a roll mill. Other additives, such as stabilizers, lubricants, fillers, and pigments can also be incorporated in the polymer.

The influence of these compounds as a processing aid in a poly(vinyl chloride) is indicated by the following data in which N,N'-dicyclohexyl-2-(cyclohexylamino)malonamide was used.

Two blends of poly(vinyl chloride) with the additives shown were prepared, the formulations being similar except that to one of them, an antiplasticizer, N,N'-dicyclohexyl-2-(cyclohexylamino)malonamide, one of the materials of this invention, was added. Each of the blends was milled in a roll mill at 320° F. and the resulting stock was molded at 370° F. and 1100 p.s.i. into sheet about one-sixteenth inch thick. Test specimens for physical properties determinations were taken therefrom.

The composition of the blends and physical properties of the molded sheet are indicated in the following table:

TABLE I

| Composition, parts by weight: | I | II |
|---|---|---|
| Diamond PVC-40 [1] | 90 | 50 |
| Advastab T-360 [2] | 2.0 | 1.0 |
| Dibutyl tin dilaurate [3] | 1.0 | 0.5 |
| Advawax 280 [4] | 0.5 | 0.25 |
| Advawax 140 [5] | 0.5 | 0.25 |
| N,N'-dicyclohexyl-2-(cyclohexylamino)malonamide | 10 | 0 |
| Tensile yield,[6] | 10,200 | 7,670 |
| Elongation break,[6] percent | 41 | 51 |
| Flexural modulus,[7] p.s.i.×10$^{-3}$ | 466 | |
| Hardness, Shore D [8] | 84 | |
| Density, g./cc | 1.3562 | |

[1] Poly(vinyl chloride) of designation GP 3-15340 according to ASTM D-1755-60T.
[2] Polymeric dibutyl tin modified mercaptide stabilizer.
[3] Stabilizer.
[4] N,N'-ethylenebis-stearamide lubricant.
[5] Edible fatty ester lubricant.
[6] ASTM D-638-61T.
[7] ASTM D-790-63.
[8] ASTM D-1706-64T.

These data demonstrate the function of the materials of this invention as antiplasticizers. The tensile yield was higher and the value for elongation break was lower for that polymer in which the malonamide had been incorporated. It will also be seen that the flexural modulus, hardness and density of the product containing the antiplasticizer were within desirable ranges.

Some indication of the amount of the material advantageously incorporated in a polymer is given by the following data showing the incorporation of N,N'-dicyclohexyl-2-(cyclohexylamino)malonamide in a polymer blend, in various percentages, and torque, flux time, and tensile yield determinations on the resulting blends. The composition of the basic blend was as follows:

| Component: | Parts by weight |
|---|---|
| Poly(vinyl chloride) | 90 |
| Blendex 401 | 10 |
| Advastab T-360 | 2.0 |
| Dibutyl tin dilaurate | 1.0 |
| Advawax 140 | 0.5 |
| Advawax 280 | 0.5 |

The test data were as follows:

| Weight percent basic blend | 100 | 95 | 91 | 87 | 84 |
|---|---|---|---|---|---|
| Weight percent "Malonamide" | 0 | 5 | 9 | 13 | 16 |
| Torque, meter-grams | 2,020 | 1,820 | 1,660 | 1,500 | 1,440 |
| Time to flux, min | 13.0 | 10.0 | 8.0 | 8.2 | 7.1 |
| Tensile yield, p.s.i | 6,820 | 8,240 | 8,700 | 8,500 | 8,510 |

The above data show that the compositions containing the malonamide had lower processing temperatures, required less time to flux, and required less energy to mix than did the composition containing no malonamide, thus demonstrating the function of the malonamide as a processing aid.

It will be evident from the foregoing that certain modifications can be made to the invention as disclosed herein. However, such are considered to be within the scope of the invention.

What is claimed is:

1. A composition of matter which comprises a polymer having incorporated therein a substituted 2-aminomalonamide of the formula

wherein R is selected from alkyl, cycloalkyl and aryl radicals and combinations thereof, the number of carbon atoms in each of said R groups being within the range of about 2 to 30, said polymer being selected from the group consisting of poly(vinyl chlorides), poly(vinylidene chlorides), poly(vinyl acetates), bisphenol polycarbonates and biphenol polyesters.

2. The composition as defined in claim 1 in which each of the R groups has about 5 to 18 carbon atoms.

3. The composition as defined in claim 1 in which each R group has at least one saturated carbocyclic ring containing at least 5 carbon atoms.

4. The composition as defined in claim 1 in which the substituted 2-aminomalonamide is incorporated in said polymer in an amount of about 0.2 to 50 weight percent of the polymer.

5. The composition as defined in claim 1 in which the substituted 2-aminomalonamide is incorporated in said polymer in an amount of about 1 to 20 weight percent of the polymer.

6. The composition as defined in claim 1 in which the substituted 2-aminomalonamide is N,N'-dicyclohexyl-2-(cyclohexylamino)malonamide.

7. The composition as defined in claim 1 which comprises about 91 weight percent poly(vinyl chloride) and about 9 weight percent N.N'-dicyclohexyl-2-(cyclohexylamino)malonamide.

References Cited

UNITED STATES PATENTS 2,267,685  12/1941  Kyrides _____ 260—32.6

JOSEPH L. SCHOFER, Primary Examiner

J. A. DONAHUE, JR., Assistant Examiner

U.S. Cl. X.R.
260—47, 89.1, 91.7